United States Patent
Mori et al.

(10) Patent No.: US 10,634,967 B2
(45) Date of Patent: Apr. 28, 2020

(54) DISPLAY DEVICE, BRIGHTNESS DEFECT CORRECTION METHOD FOR DISPLAY DEVICE, AND BRIGHTNESS DEFECT CORRECTION DEVICE FOR DISPLAY DEVICE

(71) Applicant: Panasonic Liquid Crystal Display Co., Ltd., Hyogo (JP)

(72) Inventors: Masahiro Mori, Osaka (JP); Shigeyuki Mori, Osaka (JP); Takao Tanaka, Hyogo (JP); Kazuya Nakamura, Chiba (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 149 days.

(21) Appl. No.: 15/758,212

(22) PCT Filed: Aug. 25, 2016

(86) PCT No.: PCT/JP2016/003875
§ 371 (c)(1),
(2) Date: Mar. 7, 2018

(87) PCT Pub. No.: WO2017/043029
PCT Pub. Date: Mar. 16, 2017

(65) Prior Publication Data
US 2018/0261168 A1      Sep. 13, 2018

(30) Foreign Application Priority Data
Sep. 11, 2015 (JP) ................................. 2015-178999

(51) Int. Cl.
*G02F 1/1362* (2006.01)
*G02F 1/13* (2006.01)
(Continued)

(52) U.S. Cl.
CPC ...... *G02F 1/136259* (2013.01); *G02F 1/1309* (2013.01); *G02F 1/13306* (2013.01);
(Continued)

(58) Field of Classification Search
CPC ............. G02F 1/136259; G02F 1/1309; G02F 2201/508; G09G 2320/0233; G09G 3/006; G09G 2330/10; G09G 2330/08
See application file for complete search history.

(56) References Cited

U.S. PATENT DOCUMENTS 5,280,374 A * 1/1994 Nakai ................... G02F 1/1309
349/192
2010/0188603 A1    7/2010 Ikeda
(Continued)

FOREIGN PATENT DOCUMENTS

JP       4-358120 A       12/1992
JP      10-062796 A        3/1998
(Continued)

OTHER PUBLICATIONS

Japanese Office Action issued for Japanese Patent Application No. 2015-178999, dated Apr. 26, 2019, 14 pages, with English translation.
(Continued)

*Primary Examiner* — Jessica M Merlin
(74) *Attorney, Agent, or Firm* — Hamre, Schumann, Mueller & Larson, P.C.

(57) ABSTRACT

For suppressing a deterioration of display quality due to a luminance defect, a display device, a method of correcting a luminance defect and a luminance defect corrector are provided. The display device includes a first substrate (SUB1) having gate lines (GL), data lines (DL), pixel electrodes (PIT), and a common electrode (CIT) on a first glass substrate (GB1), and a second substrate (SUB2) hav-
(Continued)

ing a plurality of optically transparent parts (CF) and a light shield part (BM) on a second glass substrate (GB2). The first or second glass substrate (GB1) or (GB2) contains a dimmer (10) including a plurality of dimming regions (20) that reduce the transmission of light. The dimmer (10) is formed to be superimposed on a trapped foreign matter (33) in plan view. This reduces the transmission of light from the luminance defect to suppress a deterioration of display quality.

4 Claims, 16 Drawing Sheets

(51) Int. Cl.
- G09G 3/00 (2006.01)
- G02F 1/133 (2006.01)
- G02F 1/1335 (2006.01)
- G09G 3/36 (2006.01)
- G02F 1/13357 (2006.01)

(52) U.S. Cl.
CPC .. *G02F 1/133512* (2013.01); *G02F 1/133514* (2013.01); *G02F 1/133611* (2013.01); *G09G 3/006* (2013.01); *G09G 3/36* (2013.01); *G02F 2201/508* (2013.01); *G09G 2320/0233* (2013.01); *G09G 2330/08* (2013.01); *G09G 2330/10* (2013.01)

(56) References Cited

U.S. PATENT DOCUMENTS

| | | | | |
|---|---|---|---|---|
| 2010/0210050 A1* | 8/2010 | Ikeda | ................ | G02F 1/133514 438/29 |
| 2014/0009729 A1* | 1/2014 | Otaki | ................ | B23K 26/0613 349/106 |

FOREIGN PATENT DOCUMENTS

| JP | 2008-165164 A | 7/2008 |
|---|---|---|
| JP | 2008-233566 A | 10/2008 |
| JP | 2009/013920 A1 | 1/2009 |
| JP | 2009-080163 A | 4/2009 |
| JP | 2009-258229 A | 11/2009 |
| JP | 2011-209549 A | 10/2011 |
| JP | 2015-63416 A | 4/2015 |
| KR | 10-2011-0112889 | 10/2011 |
| WO | 2009/022482 A1 | 2/2009 |

OTHER PUBLICATIONS

International Search Report and Written Opinion, International Patent Application No. PCT/JP2016/003875, dated Nov. 22, 2016 (18 pages).

* cited by examiner

F I G. 1
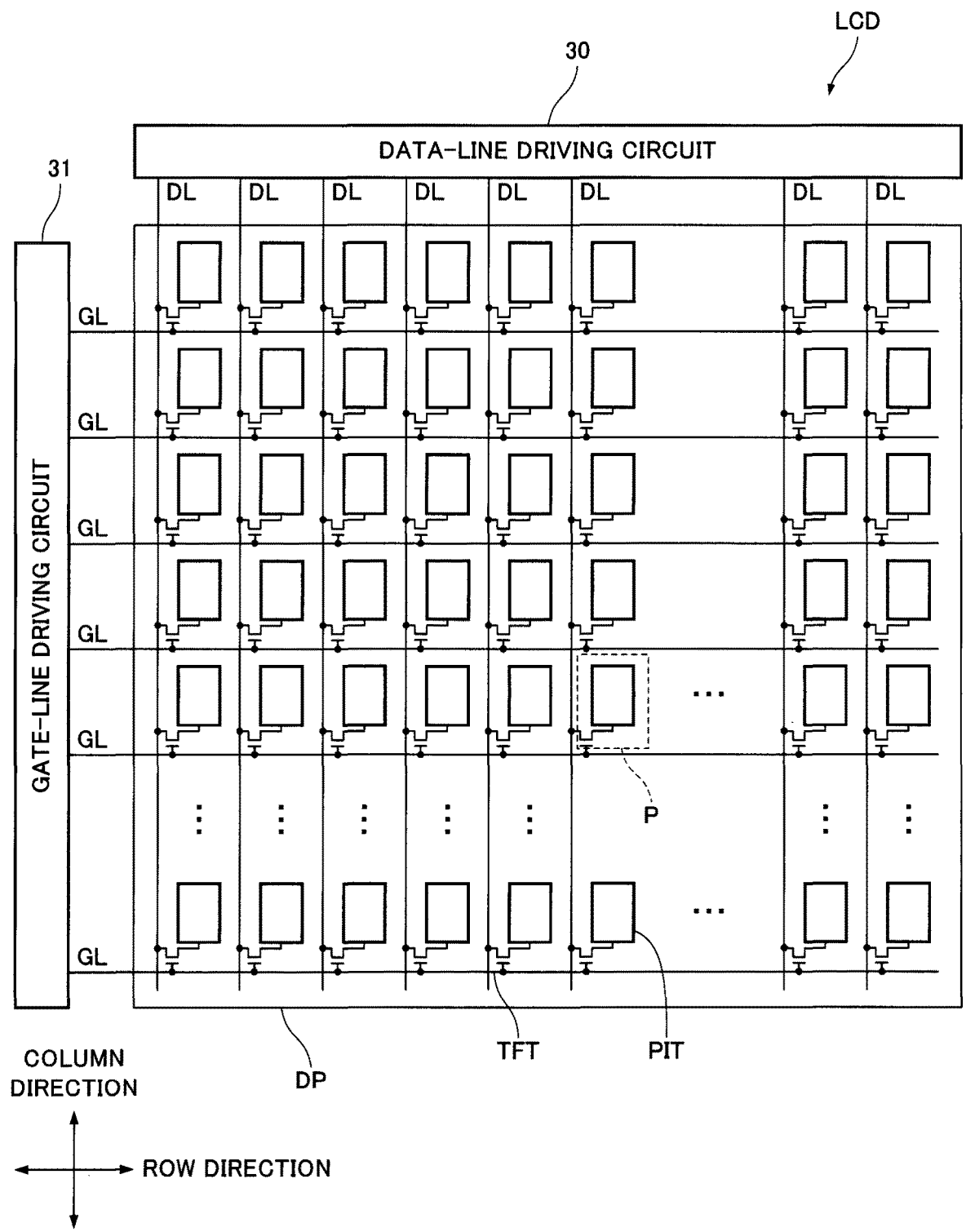

DISPLAY DEVICE, BRIGHTNESS DEFECT CORRECTION METHOD FOR DISPLAY DEVICE, AND BRIGHTNESS DEFECT CORRECTION DEVICE FOR DISPLAY DEVICE

FIELD OF THE INVENTION

The present invention relates to a display device, a method of correcting a luminance defect, and a luminance defect corrector.

BACKGROUND OF THE INVENTION

Display devices include, for example, a liquid crystal display that applies an electric field generated between a pixel electrode and a common electrode to a liquid crystal layer, which is interposed between a pair of substrates, so as to drive a liquid crystal. This can display an image with an adjusted amount of light passing through a region between the pixel electrode and the common electrode.

In the related art, for example, it is known that a liquid crystal display has a so-called luminance defect (may be called a pixel defect), that is, a pixel having a higher display luminance than a desired luminance. A luminance defect is caused by, for example, a foreign matter trapped between a pair of substrates in the manufacturing process of a liquid crystal display. Such a foreign matter disturbs liquid crystal orientation and causes a short circuit between a pixel electrode and a common electrode.

A method of correcting the luminance defect is disclosed in, for example, Japanese Patent Laid-Open No. 2009-080163.

In the method of Japanese Patent Laid-Open No. 2009-080163, a common electrode at a peripheral portion of a foreign matter is irradiated with a laser beam, so that the common electrode in contact with the foreign matter is isolated from other circuits.

Patent Document 1: Japanese Patent Laid-Open No. 2009-080163

DISCLOSURE OF THE INVENTION

In the method of Japanese Patent Laid-Open No. 2009-080163, however, the common electrode is broken by irradiation with a laser beam. This may disadvantageously scatter an electrode material during breakage or cause thermal energy adversely affecting other circuits. Thus, in the method of the related art, the display accuracy of peripheral pixels may be reduced by breaking a peripheral circuit particularly in recent display devices having high resolutions. Thus, even if display quality reduced by a luminance defect can be improved, it is difficult to maintain the display quality in the overall display device.

The present invention has been devised in view of the circumstances. An object of the present invention is to provide a display device, a method of manufacturing the same, and production equipment of the same by which a deterioration of display quality due to a luminance defect can be suppressed while keeping display quality in the overall display device.

In order to attain the object, a display device according to the present invention includes a first substrate having a plurality of signal lines and display electrodes on a first glass substrate and a second substrate having a plurality of optically transparent parts and light shield parts on a second glass substrate, the display device having a luminance defect, wherein at least one of the first glass substrate and the second glass substrate contains a dimmer, the dimmer including a plurality of dimming regions having a lower transmittance of light than the glass substrate containing the dimmer, the dimmer being formed so as to be superimposed on a foreign matter, a cause of the luminance defect, in plan view.

Moreover, adjacent ones of the dimming regions preferably have overlapping regions.

In the display device according to the present invention, the dimmer preferably has a projected shape that is enlarged from the shape of the foreign matter, the cause of the luminance defect.

Furthermore, the dimmer preferably includes at least one dimming layer where the dimming regions are arranged in a planar fashion, the at least one dimming layer including multiple dimming layers formed in the thickness direction of the glass substrate containing the dimmer.

Moreover, the dimming layers include a first dimming layer and a second dimming layer, wherein the first dimming layer formed near the foreign matter, the cause of the luminance defect, preferably has a smaller shape than the second dimming layer formed remote from the foreign matter.

Furthermore, the centers of the dimming regions making up the second dimming layer are preferably separated from the centers of the dimming regions making up the first dimming layer.

Moreover, the dimming regions making up the first dimming layer are preferably smaller in volume than the dimming regions making up the second dimming layer.

A method of correcting a luminance defect according to the present invention, the method including the steps of: testing lighting of a display panel in order to detect the luminance defect; detecting the position and the shape of the luminance defect; calculating the position and the shape of the formation region of a dimmer from the luminance defect detected in the detecting step; and forming the dimmer including a plurality of dimming regions having a lower transmittance of light than the glass substrate, the dimmer being formed by irradiating the formation region of the dimmer on the glass substrate with an energy beam.

Furthermore, the testing to forming steps are preferably repeated until no luminance defect is detected.

Moreover, in the forming step, the dimmer including a plurality of dimming layers is preferably formed, the dimming layers including a first dimming layer and a second dimming layer with the dimming regions arranged in a planar fashion, and the dimming regions making up the first dimming layer are preferably formed by a pulse laser having lower power than the dimming regions making up the second dimming layer farther from the cause of the luminance defect than the first dimming layer.

Furthermore, the dimming regions making up the first dimming layer are preferably formed by a first pulse laser having lower peak intensity than a second pulse laser forming the dimming regions making up the second dimming layer.

Moreover, the dimming regions making up the first dimming layer are preferably formed by a first pulse laser having a longer wavelength than a second pulse laser forming the dimming regions making up the second dimming layer.

A luminance defect corrector according to the present invention includes: a detector that detects a luminance defect of a display device by illuminating the display device; an arithmetic unit that calculates a formation region for forming a dimmer including a plurality of dimming regions, from the position and the shape of the detected luminance defect; an energy beam oscillator that emits an energy beam to be used for forming the dimming regions; a slit that spatially transmits the energy beam to a position where the dimming region is formed; a condenser lens that converges the energy beam; and a drive unit that moves the irradiation region of the energy beam and the display device relative to each other.

In the luminance defect corrector according to the present invention, the energy beam oscillator preferably generates a pulse laser beam of 1 picosecond or less.

Furthermore, the energy beam oscillator is preferably capable of oscillating energy beams of multiple wavelengths and selecting the wavelength of the energy beam emitted to form the dimming region.

The luminance defect corrector according to the present invention further includes a beam separator that splits or divides the energy beam having passed through the slit, into a plurality of energy beams, wherein the split or divided energy beams are caused to converge through the condenser lens and the focuses of the energy beams are superimposed on one another.

The present invention can suppress the occurrence of a luminance defect in the display device.

According to the present invention, the dimmer including the dimming regions is formed in the display device, thereby suppressing a deterioration of display quality (luminance defect). The display quality is deteriorated because polarization disturbed by a foreign matter trapped in the display device interferes with control on the amount of display light of the display device (the amount of light transmitted from a backlight).

BRIEF DESCRIPTION OF THE DRAWINGS

FIG. 1 shows the overall configuration of a liquid crystal display according to an embodiment of the present embodiment;

DESCRIPTION OF THE EMBODIMENT

An embodiment of the present invention will be described below with reference to the accompanying drawings.

In the following embodiment, a liquid crystal display will be discussed as an example. The display device of the present invention is not limited a liquid crystal display. For example, an organic electroluminescent display device may be used.

FIG. 1 is a plan view showing the overall configuration of a liquid crystal display according to the present embodiment.

A liquid crystal display LCD includes a display panel DP that displays an image, driving circuits (a data-line driving circuit 30, a gate-line driving circuit 31) that drive the display panel DP, a control circuit (not shown) that controls the driving circuits, and a backlight device 37 (FIG. 3) that backlights the display panel DP.

Figure 2:
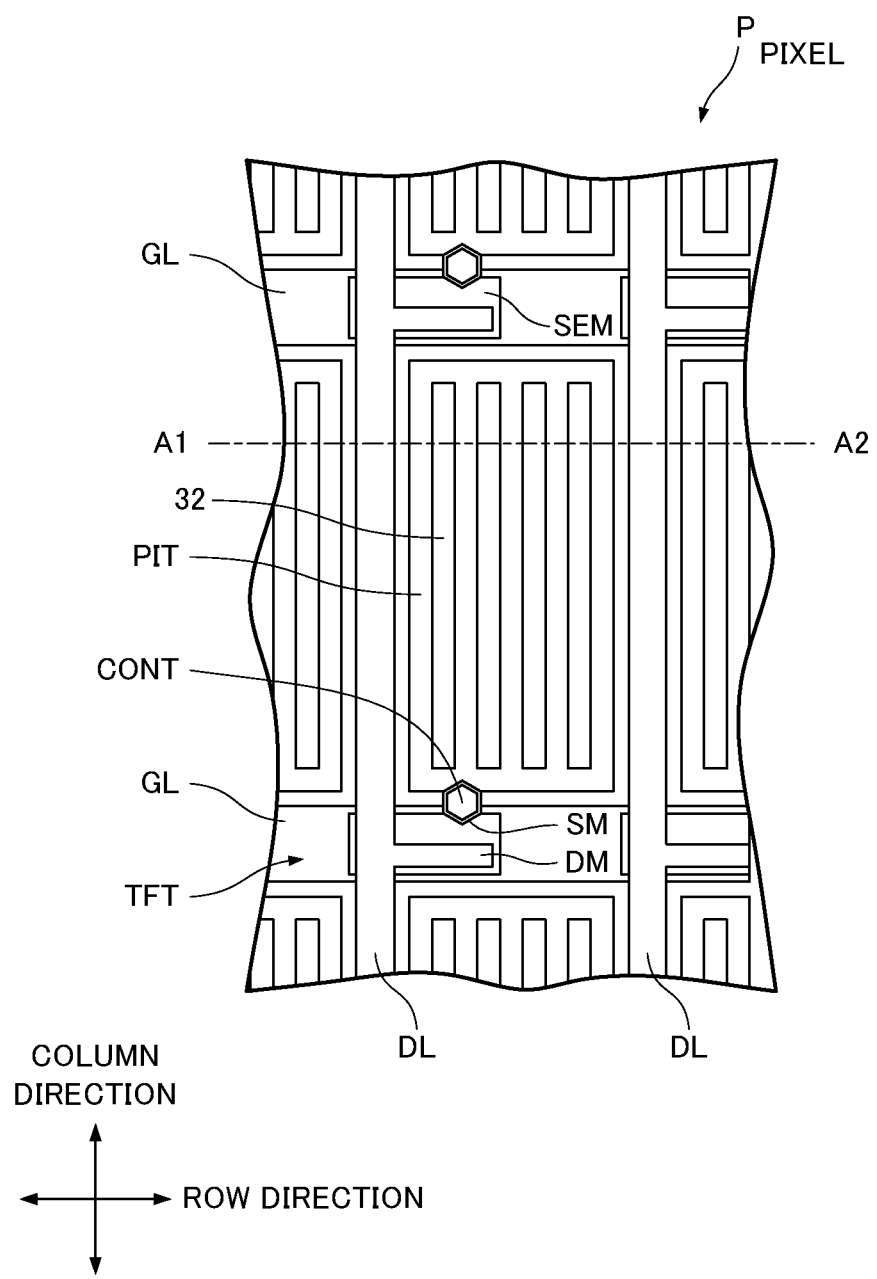
FIG. 2 is a plan view showing the configuration of a part of a display panel.
Figure 3:
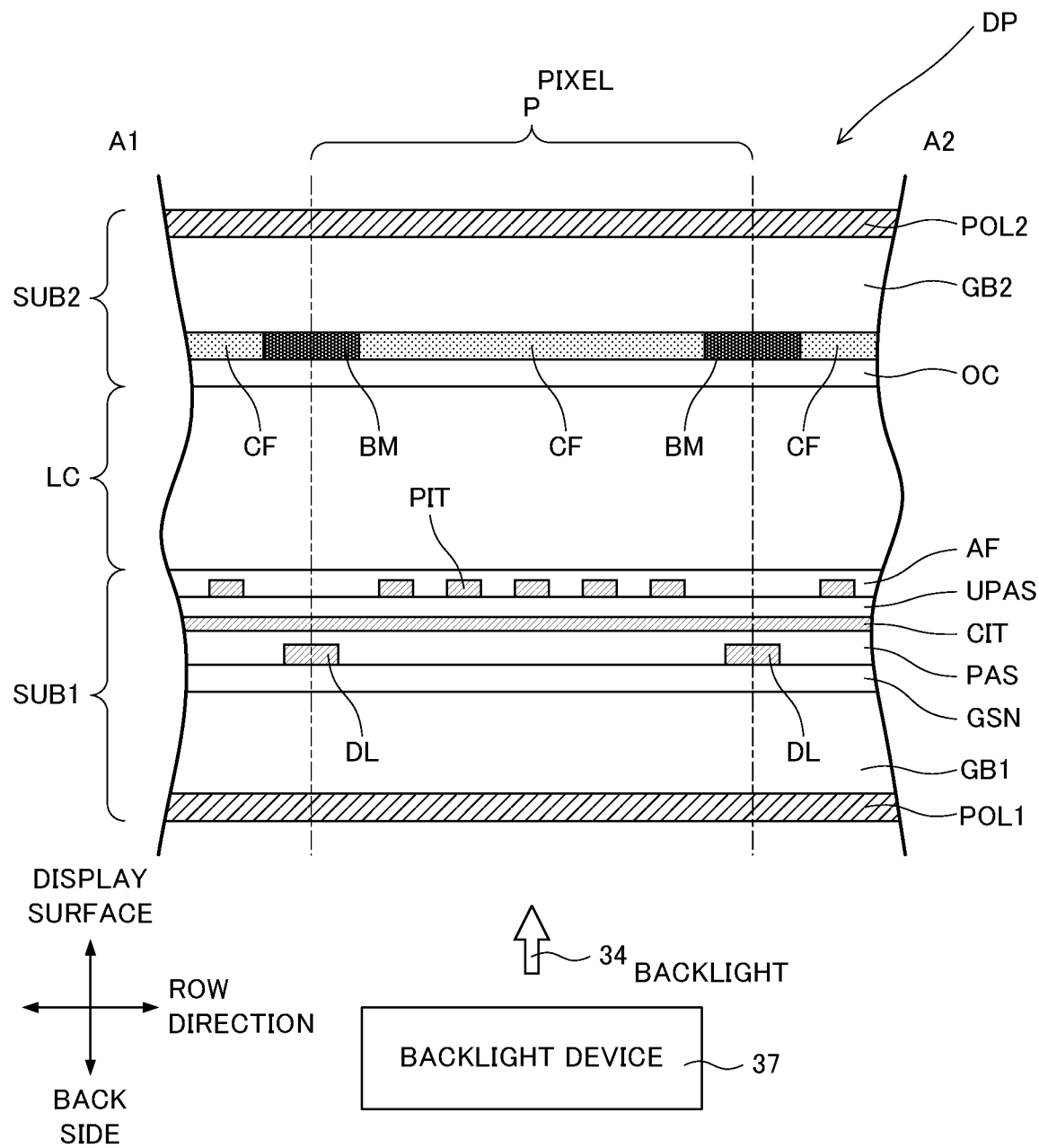
FIG. 3 is a cross-sectional view taken along line A1-A2 of FIG. 2.

FIG. 2 is a plan view showing the configuration of a part of the display panel DP. FIG. 3 is a cross-sectional view taken along line A1-A2 of FIG. 2. FIGS. 2 and 3 show a pixel P.

The display panel DP includes a thin-film transistor substrate SUB1 (Hereinafter will be called a TFT substrate SUB1) on the back side of the display panel DP, a color filter substrate SUB2 (Hereinafter, will be called a CF substrate SUB2) that is disposed on the front side of the display panel DP so as to be opposed to the TFT substrate SUB1, and a liquid crystal layer LC interposed between the TFT substrate SUB1 and the CF substrate SUB2. The TFT substrate SUB1 corresponds to a first substrate and the CF substrate SUB2 corresponds to a second substrate.

The TFT substrate SUB1 has a plurality of data lines DL extended in the column direction and a plurality of gate lines GL extended in the row direction. Thin film transistors TFT are formed near the intersections of the data lines DL and the gate lines GL. A rectangular region surrounded by the two adjacent data lines DL and the two adjacent gate lines GL is defined as the pixel P. The pixels P are arranged in a matrix on the TFT substrate SUB1.

The pixel P has a pixel electrode PIT (display electrode) that includes a translucent conductive film made of indium tin oxide (ITO) and so on. As shown in FIG. 2, the pixel electrode PIT has openings 32 (e.g., slits) that are shaped like strips. The thin film transistor TFT has a semiconductor layer SEM made of amorphous silicon (aSi) on a gate insulating film GSN (FIG. 3). A drain electrode DM and a source electrode SM are formed on the semiconductor layer SEM (FIG. 2). The drain electrode DM is electrically connected to the data line DL. The source electrode SM and the pixel electrode PIT are electrically connected to each other via a contact hole CONT.

The laminated structure of the parts of the pixel P is not limited to the configuration of FIG. 3. A known configuration may be used instead. For example, in the configuration of FIG. 3, the gate lines GL (FIG. 2) are formed on a glass substrate GB1 of the TFT substrate SUB1 and the gate insulating film GSN is formed so as to cover the gate lines GL. Moreover, the data lines DL are formed on the gate insulating film GSN and an insulating film PAS is formed so as to cover the data lines DL. Furthermore, a common electrode CIT (display electrode) is formed on the insulating film PAS, and an upper insulating film UPAS is formed so as to cover the common electrode CIT. The pixel electrode PIT is formed on the upper insulating film UPAS, and an alignment layer AF is formed so as to cover the pixel electrode PIT. A polarizing plate POL1 (first polarizing plate) is formed on the back side of the glass substrate GB1.

In the CF substrate SUB2, a black matrix BM (light shield part) and a color filter CF (e.g., a red part, a green part, and a blue part) (optically transparent part) are formed on a glass substrate GB2. An overcoat layer OC is formed so as to cover the black matrix BM and the color filter CF. A polarizing plate POL2 (second polarizing plate) is formed on the front side of the glass substrate GB2.

According to the configuration of FIG. 3, the liquid crystal display LCD has a so-called in-plane switching (IPS) configuration. The liquid crystal display of the present embodiment is not limited to this configuration.

A method of driving the liquid crystal display LCD will be simply described below.

A scanning gate voltage outputted from the gate-line driving circuit is supplied to the gate lines GL, whereas a video data voltage outputted from the data-line driving circuit is supplied to the data lines DL. When a gate on voltage is supplied to the gate line GL, the semiconductor layer SEM of the thin film transistor TFT decreases in resistance and a data voltage supplied to the data line DL is supplied to the pixel electrode PIT through the source electrode SM. Moreover, a common voltage outputted from a common electrode driving circuit (not shown) is supplied to the common electrode CIT. Thus, an electric field (driving electric field) is generated between the pixel electrode PIT and the common electrode CIT and drives the liquid crystal layer LC so as to display an image.

Figure 4:
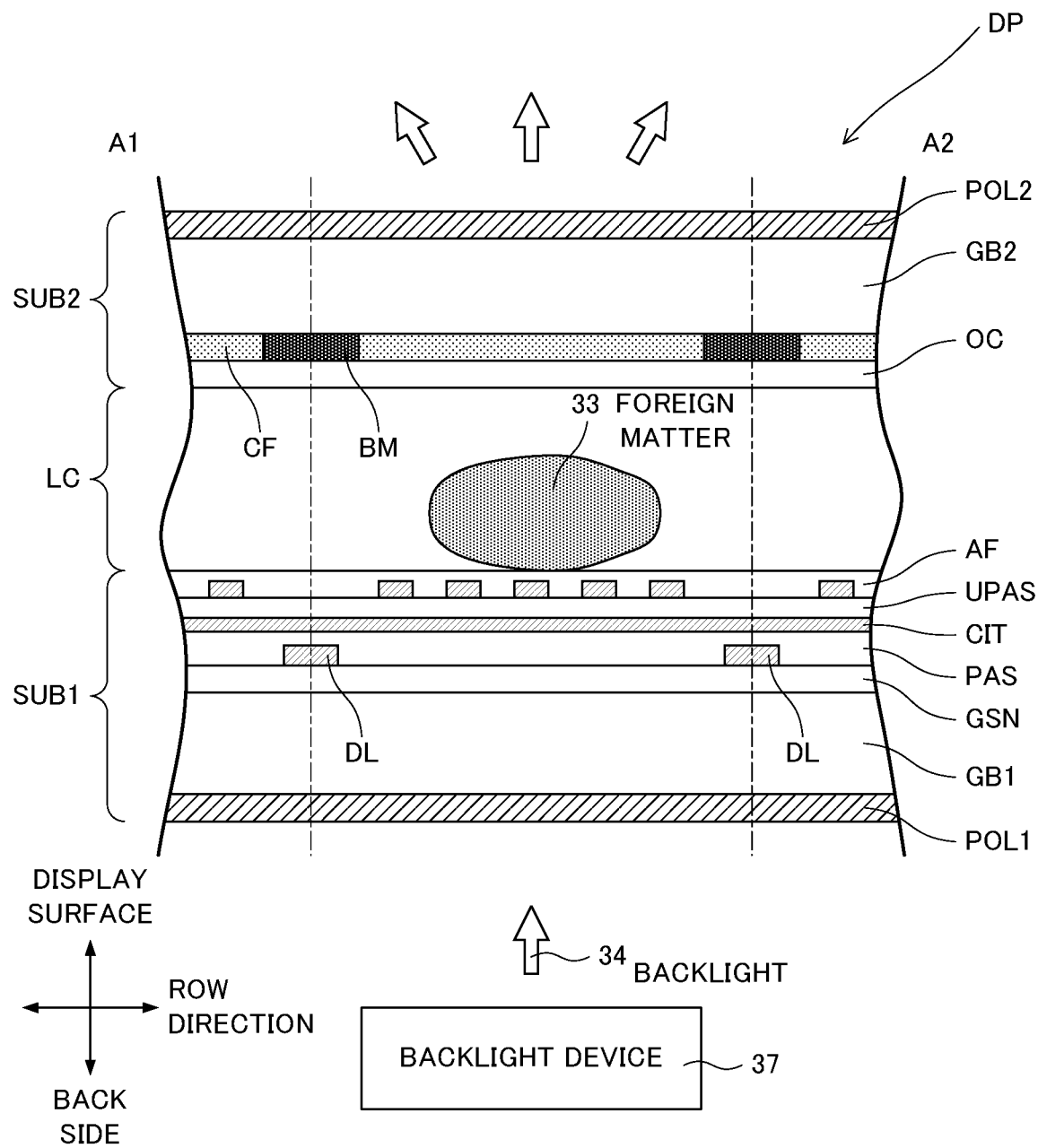
FIG. 4 is a cross-sectional view schematically showing an example of a luminance defect.

In this case, the liquid crystal display LCD may have a luminance defect in the manufacturing process such that the display luminance of a pixel is higher than a desired luminance. FIG. 4 shows an example of a luminance defect of the pixel P.

FIG. 4 shows that a foreign matter, e.g., an organic matter or a metal is trapped between the TFT substrate SUB1 and the CF substrate SUB2 in the manufacturing process of the liquid crystal display LCD. In the pixel P of FIG. 4, a foreign matter (tramp material) 33 disturbs liquid crystal orientation so as to leak backlight 34, leading to a luminance defect.

Figure 5:
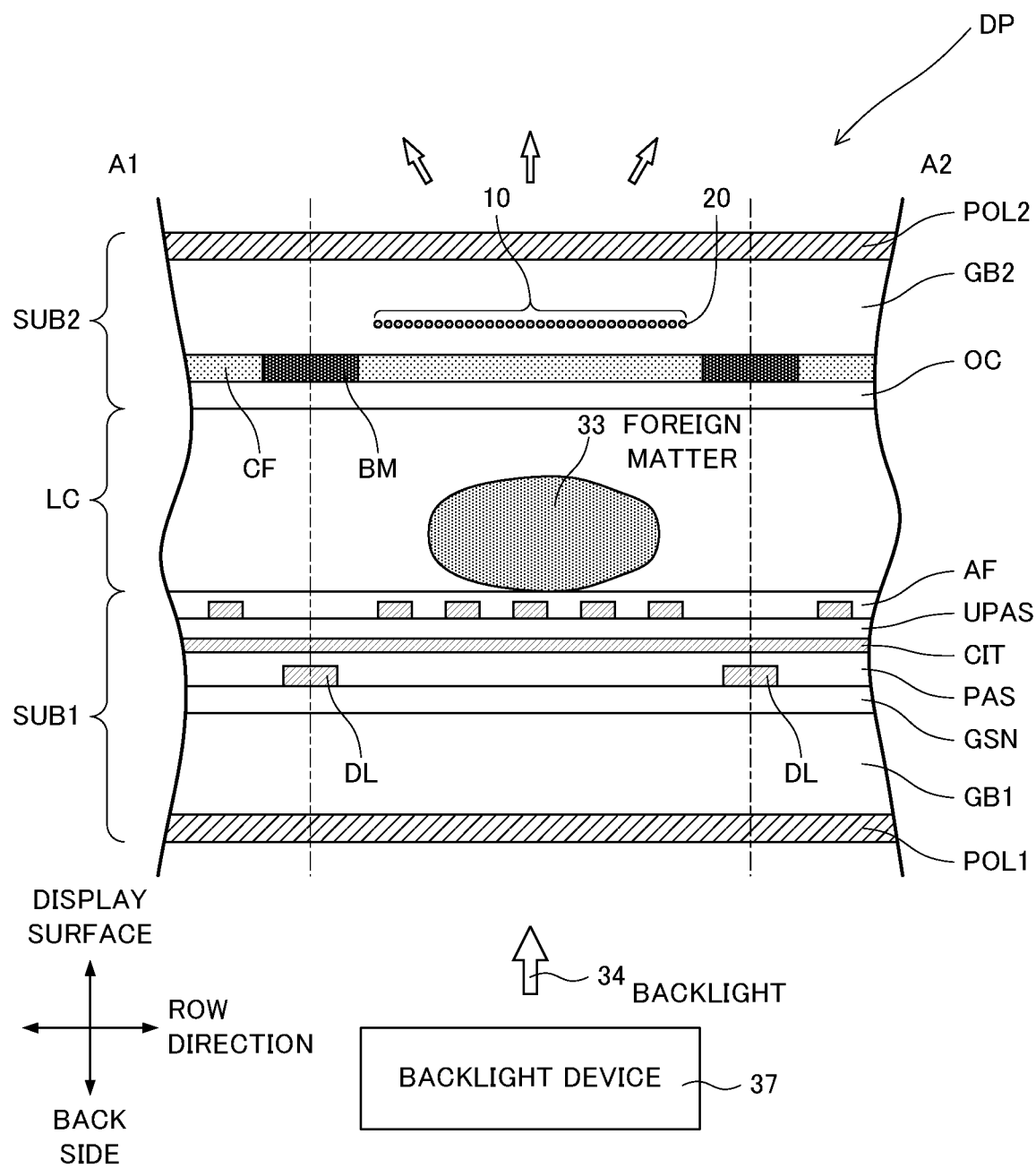
FIG. 5 is a cross-sectional view showing the configuration of a pixel having a dimmer in the liquid crystal display of the present invention.

The liquid crystal display LCD according to the present embodiment is configured to suppress the luminance defect. Specifically, as shown in FIG. 5, the glass substrate GB2 of the CF substrate SUB2 contains a dimmer 10 that reduces the transmission of the backlight 34. The dimmer 10 includes a plurality of dimming regions 20 that are arranged at certain intervals in a planar fashion in a part of the glass substrate GB2 according to the size of the foreign matter 33.

The dimming regions 20 are produced by coloring on a part of the glass substrate GB2 such that the transmittance of the backlight 34 passing through the dimming regions 20 is lower than that of the backlight 34 passing through the glass substrate GB2 around the dimming regions 20.

Alternatively, the dimming regions 20 are produced with a phase change on a part of the glass substrate GB2 such that the transmittance of the backlight 34 passing through the dimming regions 20 is lower than that of the backlight 34 passing through the glass substrate GB2 around the dimming region 20.

The dimming regions 20 are arranged at certain intervals in a planar fashion. The adjacent dimming regions 20 may be in contact with each other in a planar fashion so as to form the dimmer 10.

The dimming regions 20 can be formed by irradiating the glass substrate GB2 with an energy beam outside the display panel DP from the polarizing plate POL2.

Figure 6:
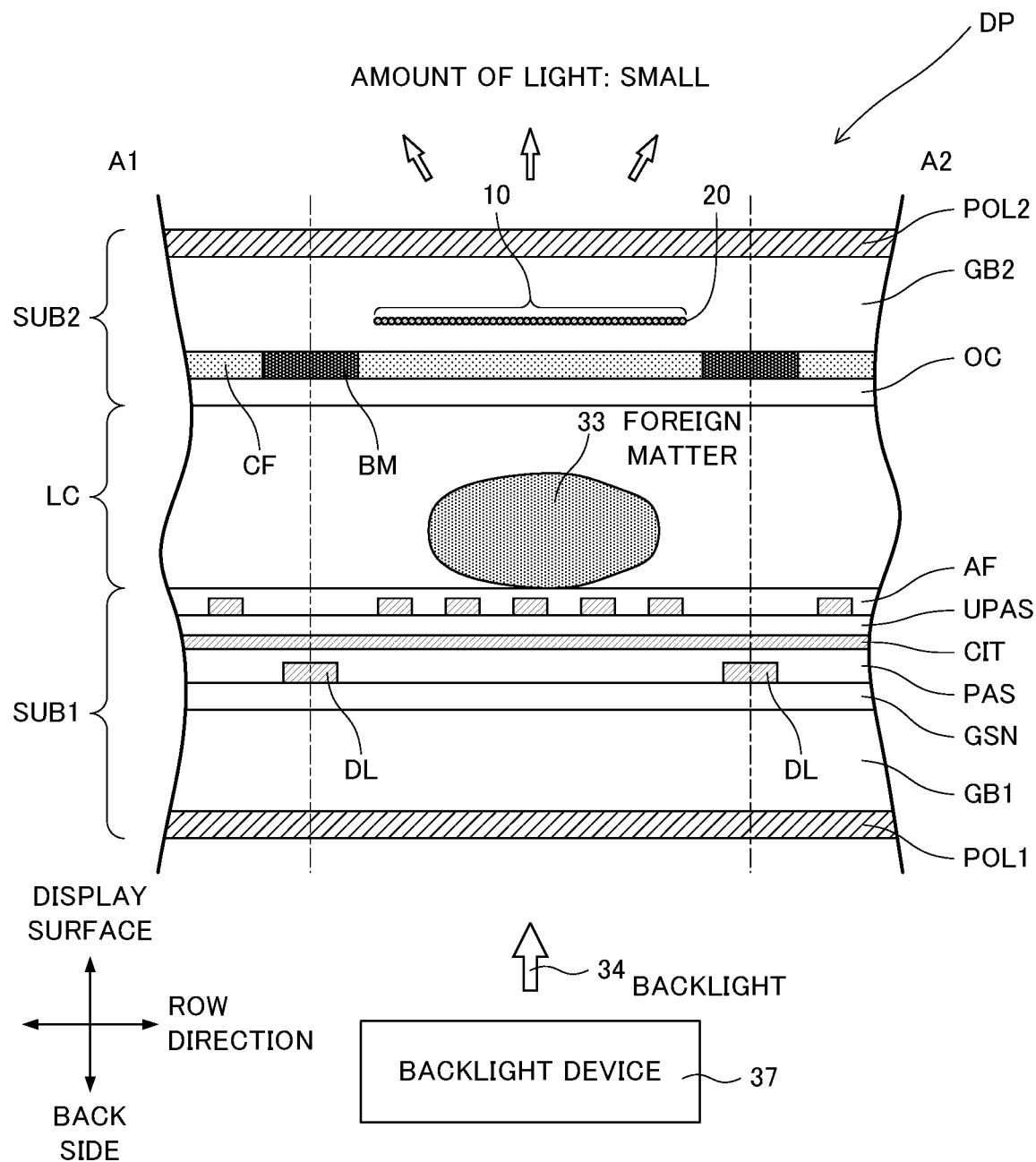
FIG. 6 is a cross-sectional view showing another configuration of the pixel having the dimmer in the liquid crystal display of the present invention.
Figure 7:
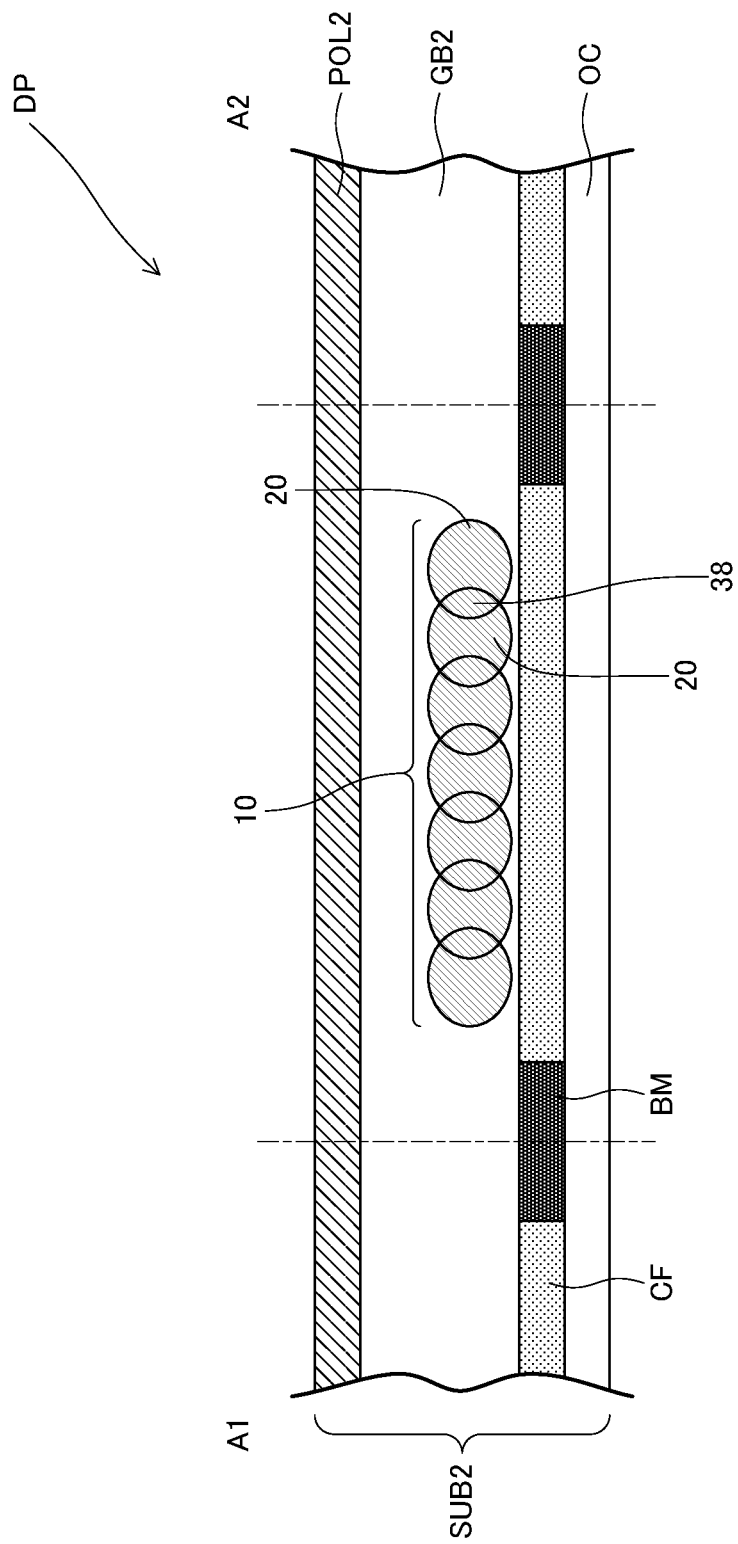
FIG. 7 is an enlarged schematic diagram showing overlapping dimming regions in the liquid crystal display of the present invention.

FIG. 6 shows another configuration for suppressing the luminance defect in the liquid crystal display LCD according to the present embodiment. FIG. 7 is an enlarged schematic diagram showing the overlapping dimming regions 20 in the liquid crystal display according to the present embodiment.

In the dimmer 10, the dimming regions 20 arranged in a planar fashion may have overlapping portions 38 where the adjacent dimming regions 20 spatially overlap each other. Generally, the dimming capability of the dimming region 20 decreases from the center toward the outer edge. Thus, if the dimming regions 20 are spaced from each other or are adjacent to each other, dimming characteristics vary in the region of the dimmer 10. Hence, the dimming characteristics of the dimmer 10 can be made uniform by, as shown in FIG. 7, spatially overlapping portions of the adjacent dimming regions 20 so as to superimpose the outer edges of the dimming regions 20. The dimming region has a high transmittance and degraded dimming characteristics on the outer edges.

Figure 8:
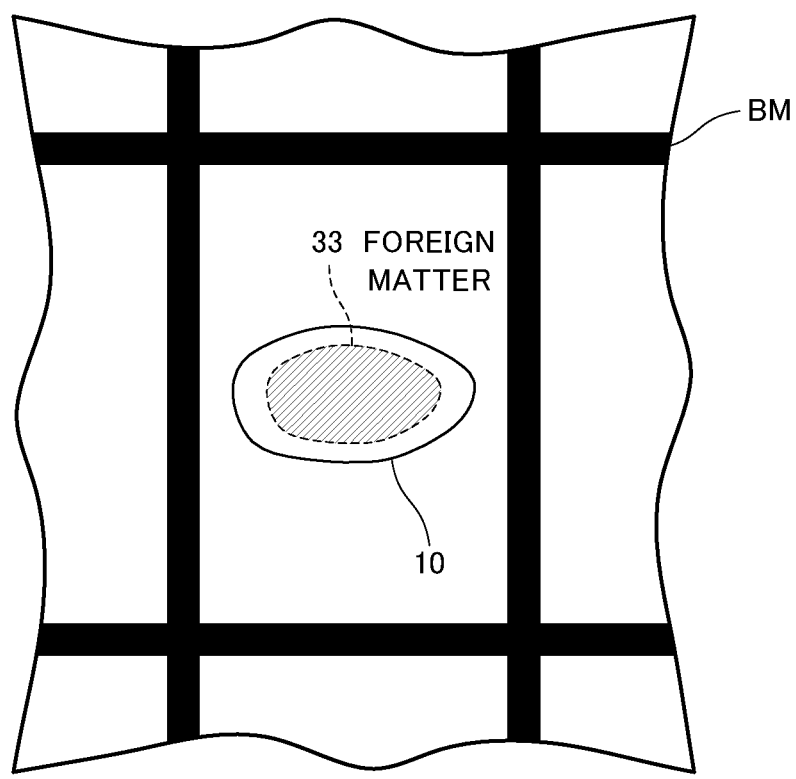
FIG. 8 is a top view showing the configuration of the pixel having the dimmer in the liquid crystal display of the present invention.

FIG. 8 is a top schematic diagram of the dimmer 10 viewed from a liquid crystal display surface. The dimmer 10 is formed so as to be superimposed on the foreign matter 33, the cause of a luminance defect, in plan view. The dimmer 10 may be formed along the shape of the luminance defect of the foreign matter 33, or may have an enlarged analogous shape of the luminance defect so as to cover the luminance defect caused by the foreign matter 33.

Specifically, the dimmer 10 and the luminance defect of the foreign matter 33 may be identical in form and size in plan view. The dimmer 10 may have the same shape as the luminance defect and cover the luminance defect, or the dimmer 10 may have an enlarged analogous shape of the luminance defect of the foreign matter 33 in plan view so as to cover and surround the shape of the luminance defect.

The dimmer 10 does not need to have the same shape as the luminance defect as long as the dimmer 10 can cover the shape of the luminance defect in plan view.

In this case, the same shape as the luminance defect of the foreign matter 33 in plan view is the shape of the luminance defect of the foreign matter 33 when the foreign matter 33 is projected to the surface of the glass substrate GB2 in a direction orthogonal to the surface of the glass substrate GB2.

The dimmer 10 attenuates the transmitted light of the backlight 34. For example, the dimmer 10 always blocks light even if light is to be transmitted for a display device. As shown in FIG. 8, the dimmer 10 is formed only in a necessary and sufficient region according to the shape of the luminance defect. This allows a region other than the dimmer 10 to effectively function and prevents deactivation of an overall pixel having a luminance defect. Since the dimmer 10 is formed only in the necessary and sufficient region, the productivity of the dimmer 10 can be improved.

Conversely, the dimmer 10 formed larger than the shape of the luminance defect of the foreign matter 33 can more reliably reduce the part of the luminance defect. If the dimmer 10 has an analogous shape larger than the luminance defect, a magnification only needs to be set to prevent leakage of light when the display panel DP is viewed in a diagonal direction.

In other words, the shape and size of the dimmer 10 are more preferably determined according to a state of the luminance defect.

Figure 9:
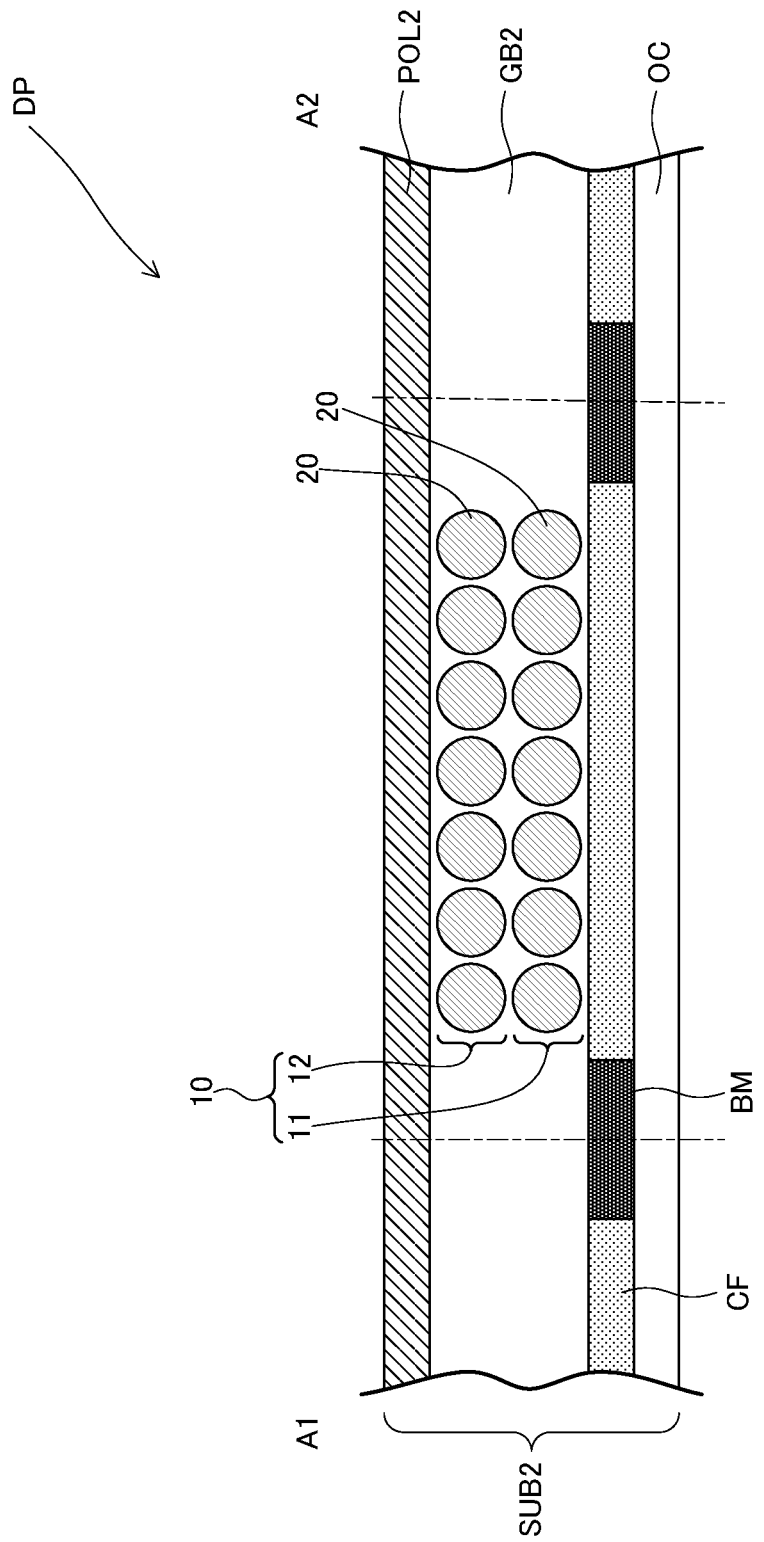
FIG. 9 is an enlarged schematic diagram showing the configuration of the dimmer in the liquid crystal display of the present invention.

FIG. 9 is an enlarged schematic diagram showing the configuration of the dimmer, that is, another configuration for suppressing the luminance defect in the liquid crystal display LCD according to the present embodiment.

The dimmer 10 includes first and second dimming layers 11 and 12 stacked in the thickness direction of the display panel DP in the glass substrate GB2. The first and second dimming layers 11 and 12 include the dimming regions 20 arranged in a planar fashion. The number of layers is not limited to two.

Since the dimmer is composed of multiple layers, the degree of dimming can be controlled according to the number of layers of the dimmer. The state of the luminance defect changes according to the size and shape of the trapped foreign matter 33 and thus varies the necessary dimming characteristics of the dimmer 10. The dimmer is provided with the necessary and sufficient number of layers according to the degree of a luminance defect, thereby improving productivity for forming the dimmer.

Figure 10:
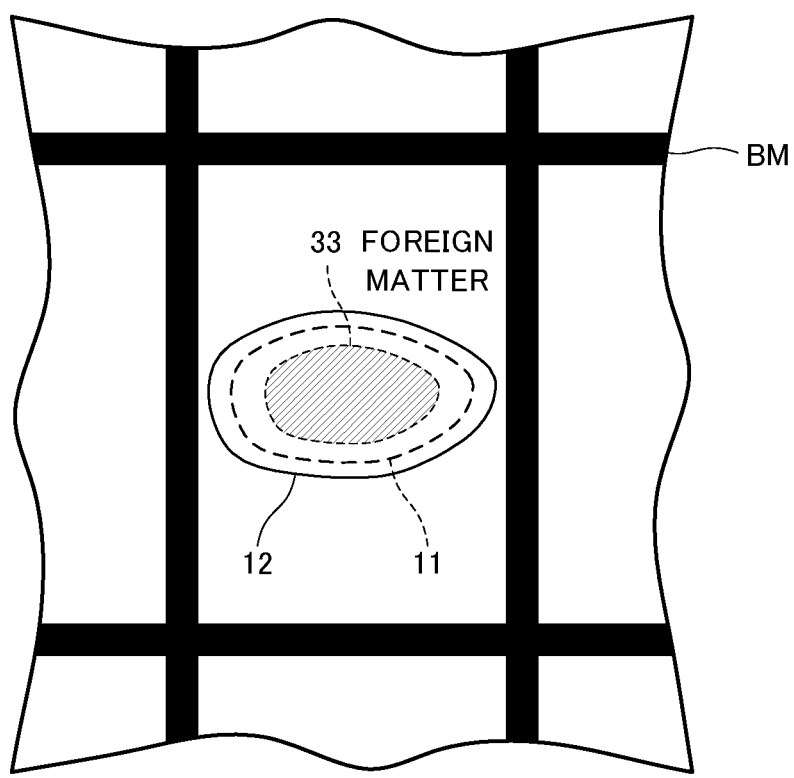
FIG. 10 is a top view showing the configuration of the pixel having the dimmer in the liquid crystal display of the present invention.

FIG. 10 is a top schematic diagram showing another configuration for suppressing the luminance defect in the liquid crystal display LCD according to the present embodiment. The part of a luminance defect is viewed from the liquid crystal display surface.

If the dimmer 10 includes the first and second dimming layers 11 and 12 stacked in the thickness direction of the display panel DP, the dimmer 10 has an analogously enlarged shape of the luminance defect in plan view. The magnification of the first dimming layer 11 near the foreign matter 33 may be smaller than that of the second dimming layer 12 remote from the foreign matter 33. In FIG. 10, the first and second dimming layers 11 and 12 are stacked in different sizes in plan view. Since light leaking from the foreign matter 33 radially extends, the magnification of the second dimming layer 12 formed at a position remote from the foreign matter 33 is increased so as to more effectively reduce the leakage of light. The number of layers of the dimmer 10 is not limited to two.

Figure 11:
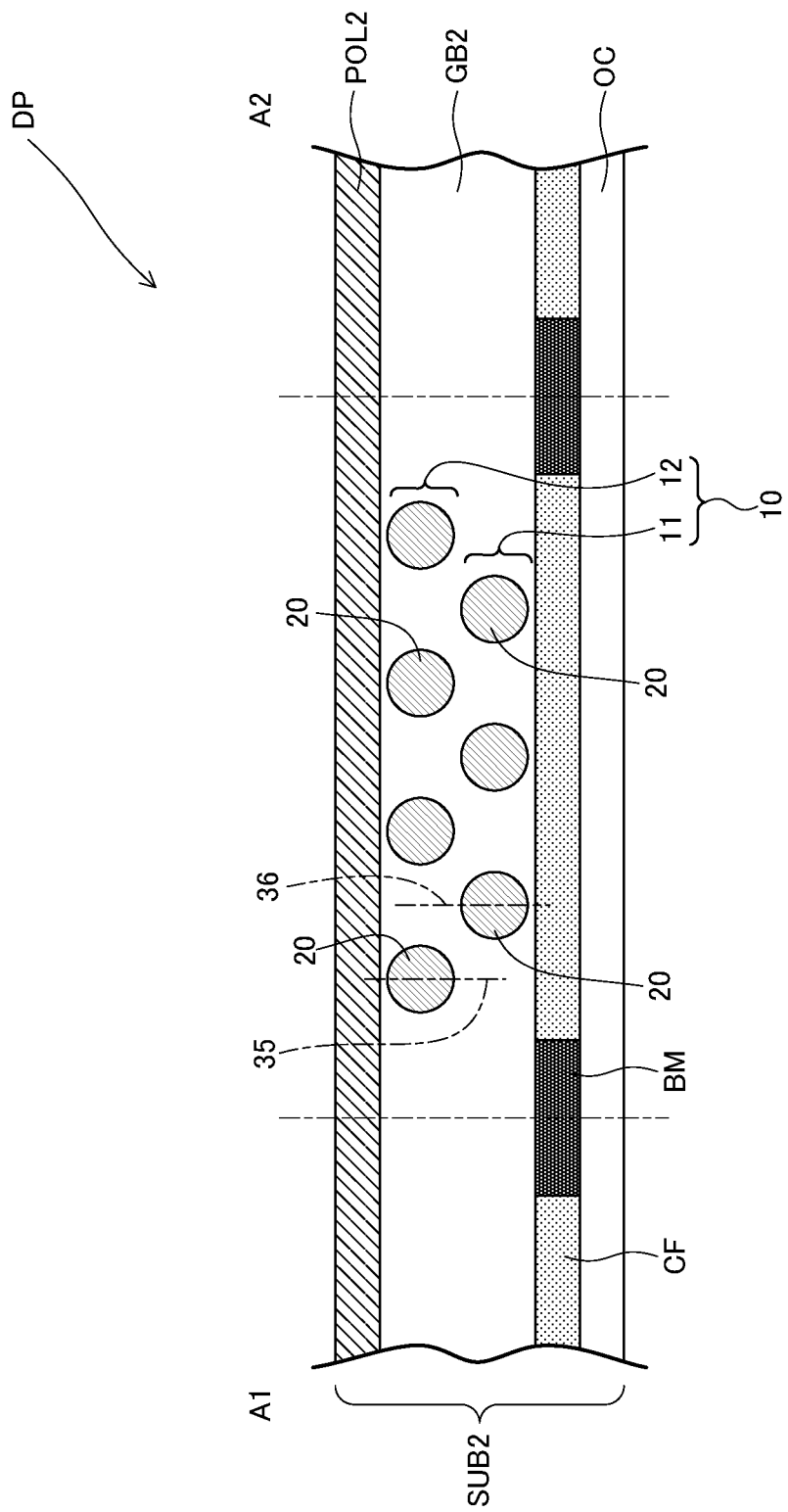
FIG. 11 is an enlarged schematic diagram showing the configuration of the dimmer in the liquid crystal display of the present invention.

FIG. 11 is an enlarged schematic diagram showing the configuration of the dimmer, that is, another configuration for suppressing the luminance defect in the liquid crystal display LCD according to the present embodiment.

If the dimmer 10 includes the first and second dimming layers 11 and 12 stacked in the thickness direction of the display panel DP, a center 35 orthogonal to the glass substrate GB2 of the dimming region 20 making up the second dimming layer 12 may not coincide with a center 36 orthogonal to the glass substrate GB2 of the dimming region 20 making up the adjacent first dimming layer 11.

The transmittance of light varies between the center and the outer edge of the dimming region 20. Thus, the center 35 of the dimming region 20 of the second dimming layer 12 is shifted from the center 36 of the dimming region 20 of the first dimming layer 11, thereby alternately arranging the centers and the outer edges of the dimming regions 20 in the thickness direction of the display panel DP. This can achieve uniform dimming characteristics over the dimmer 10 including the stacked layers.

The center 35 of the dimming region 20 making up the second dimming layer 12 is located at a midpoint between the centers 36 of the two dimming regions 20 making up the first dimming layers 11, thereby achieving the most uniform dimming characteristics. The number of layers of the dimmer 10 is not limited to two. In the case of three or more dimming layers, the centers of the dimming regions making up the adjacent dimming layers may be separated from each other.

Figure 12:
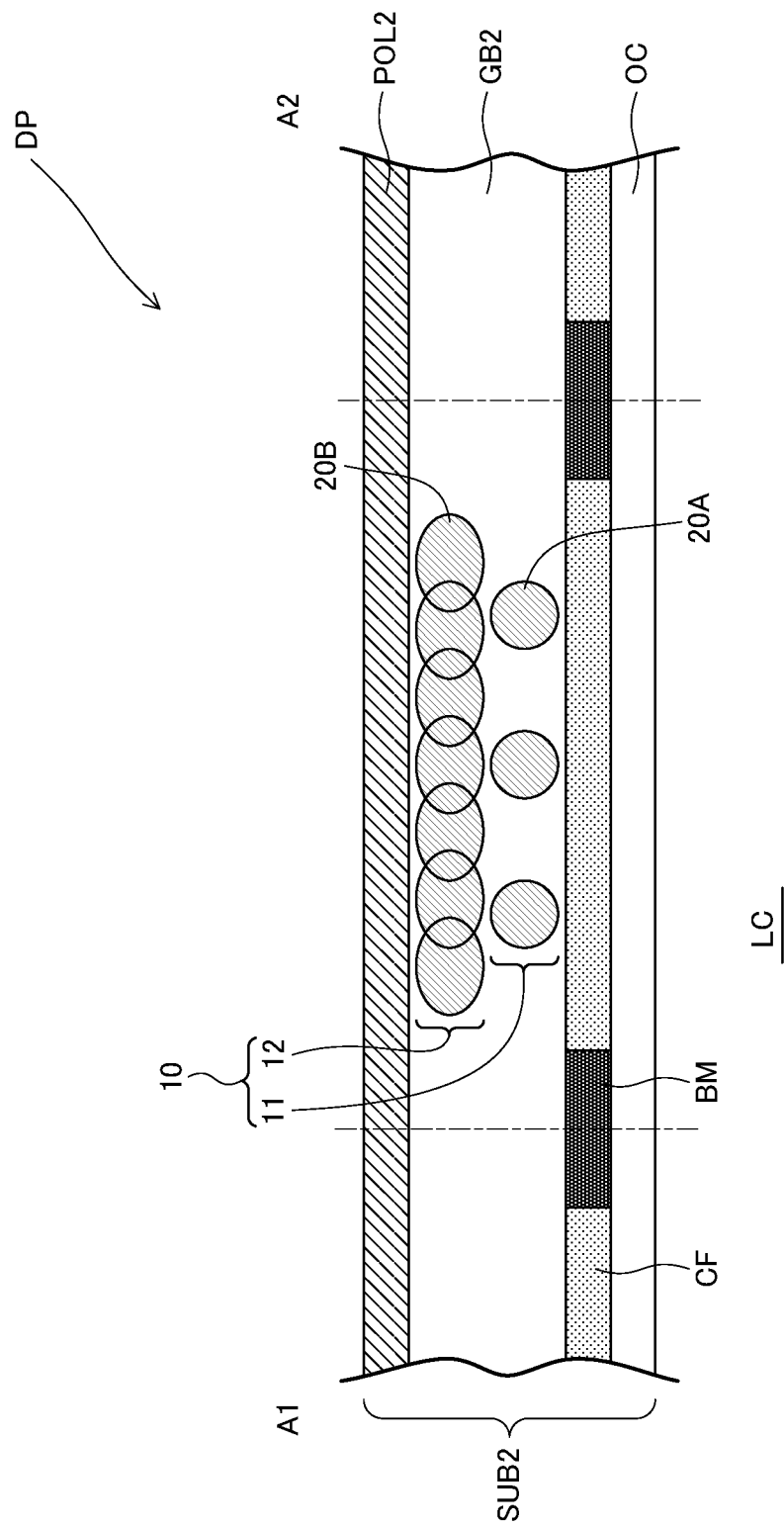
FIG. 12 is an enlarged schematic diagram showing the configuration of the dimmer in the liquid crystal display of the present invention.

FIG. 12 is an enlarged schematic diagram showing the configuration of the dimmer in another configuration for suppressing the luminance defect in the liquid crystal display LCD according to the present embodiment.

If the dimmer includes the first and second dimming layers 11 and 12 stacked in the thickness direction of the display panel DP, a dimming region 20B making up the second dimming layer 12 remote from the foreign matter 33 may have a larger volume than a dimming region 20A making up the first dimming layer 11 near the foreign matter 33. The size of the dimming region is affected by the intensity and density of an emitted energy beam. The dimming region is increased by irradiation with a high-intensity energy beam. In the formation of the dimming regions, a high-energy beam partially reaches the lower liquid crystal layer. The high-energy beam reaching the liquid crystal layer damages the liquid crystal layer. Thus, the dimming region 20A making up the first dimming layer 11 near the foreign matter 33 is preferably formed by irradiation with a low-intensity energy beam so as to reduce damage to the liquid crystal layer LC. The number of layers of the dimmer 10 is not limited to two.

Moreover, if the first dimming layer 11 is formed near the foreign matter 33 and the second dimming layer 12 is formed farther from the foreign matter 33 than the first dimming layer 11, an energy beam leaking in the formation of the dimming regions 20 is partially absorbed by the first dimming layer 11 formed near the luminance defect. Thus, the possibility of damage to a liquid crystal can be reduced even if a high-intensity energy beam is emitted, thereby improving productivity for forming the second dimming layer 12.

The embodiments varying in configurations were described in the foregoing explanation. The configuration corresponding to FIG. 6, the configuration corresponding to FIG. 9, and the configuration corresponding to FIG. 12 are suitable in this order in view of productivity and so on.

The dimmers 10 according to the embodiments may be formed in the glass substrate GB1 of the TFT substrate SUB1. Alternatively, the dimmer 10 may be formed in each of the glass substrate GB1 and the glass substrate GB2. In other words, the dimmer 10 only needs to be formed in at least one of the glass substrate GB1 of the TFT substrate SUB1 and the glass substrate GB2 of the CF substrate SUB2. Moreover, the dimmer in the glass substrate GB1 may be formed at the same position as the dimmer formed in the glass substrate GB2 or at a different position from the dimmer formed in the glass substrate GB2. For example, the dimmer formed in the glass substrate GB1 may be formed near the backlight in the glass substrate GB1, whereas the dimmer formed in the glass substrate GB2 may be formed near the liquid crystal layer LC in the glass substrate GB2.

The configuration can reduce the luminance of a pixel having a luminance defect, thereby reducing the noticeability of the luminance defect (leakage of light). This can reduce a display quality loss caused by a luminance defect and increase the manufacturing yield of the liquid crystal display LCD. In the example of the foregoing explanation, the dimmer is provided in preparation for a luminance defect where a luminance increases. The dimmer may be provided in preparation for a luminance defect where a luminance decreases. The dimmer adjusts the transmission of backlight to suppress the luminance defect.

A method of manufacturing the liquid crystal display LCD will be described below.

The method of manufacturing the liquid crystal display LCD includes the step of manufacturing the TFT substrate SUB1, the step of manufacturing the CF substrate SUB2, the step of bonding the TFT substrate SUB1 and the CF substrate SUB2, the step of injecting a liquid crystal, the step of testing the lighting of the display panel DP, and the step of correcting a luminance defect.

Of these steps, known methods can be used for the step of manufacturing the TFT substrate SUB1, the step of manufacturing the CF substrate SUB2, the step of bonding the TFT substrate SUB1 and the CF substrate SUB2, the step of injecting a liquid crystal, and the step of testing lighting.

For example, the step of manufacturing the TFT substrate SUB1 includes the step of forming the gate lines GL, the data lines DL, the pixel electrodes PIT, the common electrode CIT, the insulating films, and the polarizing plate POL1 on the glass substrate GB1. The pixels P defined in the TFT substrate SUB1 may include a red pixel for red, a green pixel for green, and a blue pixel for blue. The step of manufacturing the CF substrate SUB2 includes the step of forming the black matrix BM, the color filter CF, and the polarizing plate POL2 on the glass substrate GB2.

The step of testing lighting and the step of correcting a luminance defect will be discussed below.

Figure 13:
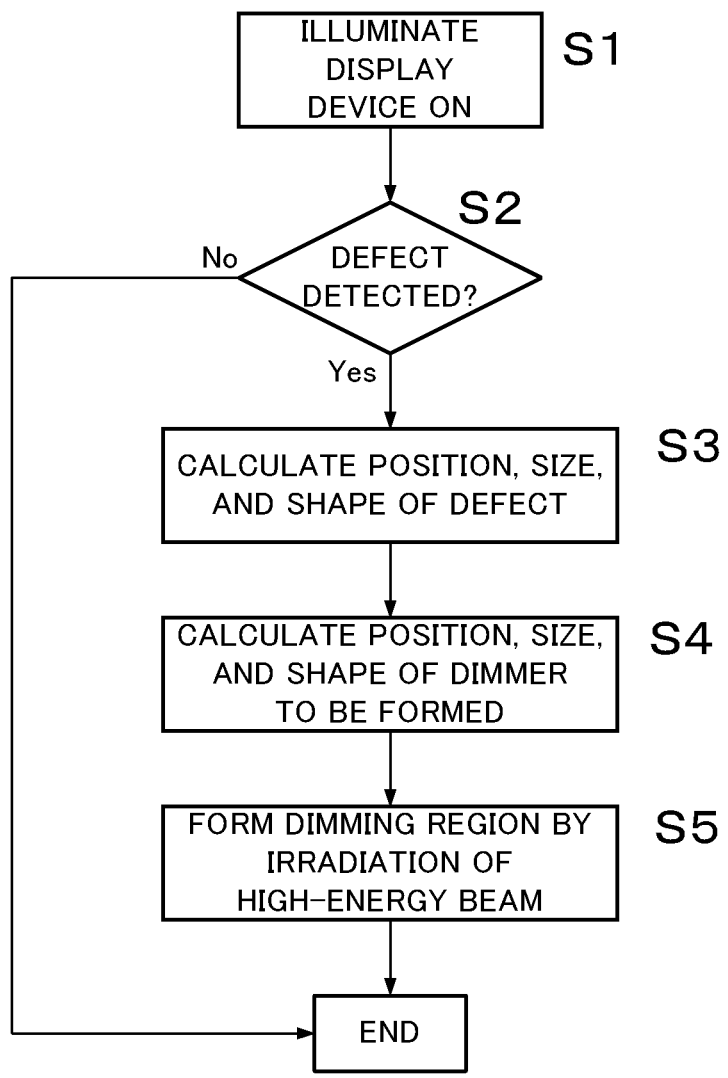
FIG. 13 is a flowchart showing a method of correcting a luminance defect in the liquid crystal display of the present invention.
Figure 15:
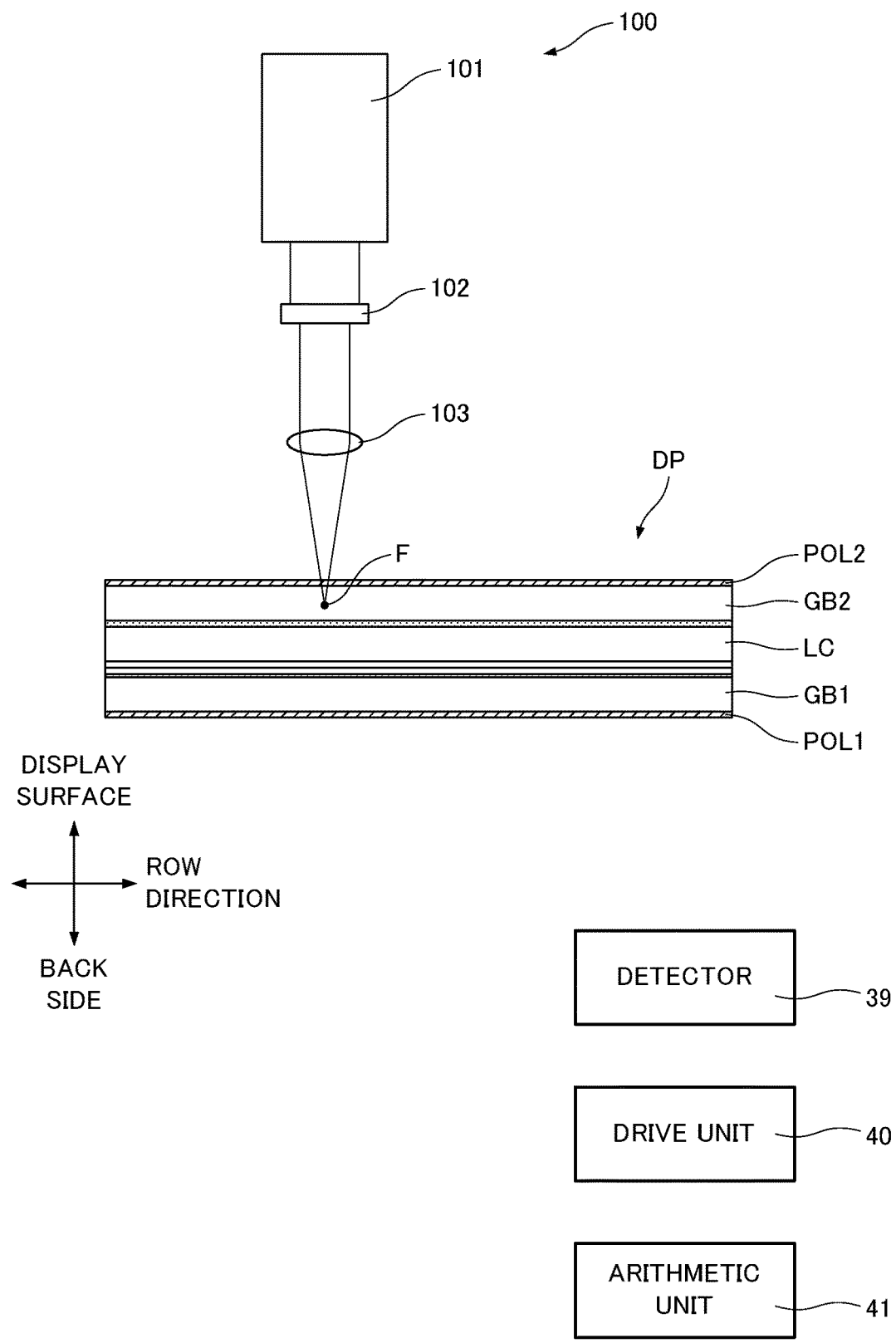
FIG. 15 is a schematic diagram showing the configuration of production equipment for the liquid crystal display of the present invention.

FIG. 15 shows a luminance defect corrector 100. FIG. 13 is a flowchart showing a method of correcting a luminance defect.

The luminance defect corrector 100 includes a detector 39 that detects a luminance defect, a drive unit 40 that moves the irradiation region of an energy beam and the liquid crystal display LCD relative to each other, and an arithmetic unit 41 that calculates the position, size, and shape of a luminance defect and the position, size, and shape of the dimmer formed by irradiation with an energy beam.

First, in the step of testing lighting, the detector 39 detects a luminance defect. For example, the detector 39 illuminates the overall display panel DP or each line of the display panel DP to measure the luminance of each pixel. Subsequently, the detector 39 detects, as a luminance defect, a pixel deviating from a predetermined luminance range, for example, a pixel with a measured luminance larger than a predetermined threshold value. The detector 39 outputs position information on pixels detected as luminance defects. A luminance defect may be visually detected by an operator. When a luminance defect is detected, the process advances to the step of correcting the luminance defect.

The luminance defect corrector 100 includes a high-energy beam oscillator 101, a slit 102, and a condenser lens 103. In an example of the present embodiment, the high-energy beam oscillator 101 is a laser having a wavelength of 1552 nm and a pulse width of 800 fs.

The display device is illuminated (S1) to detect a luminance defect (S2), and then in the step of correcting the luminance defect, first, the luminance defect corrector 100 acquires position information and shape information about pixels having luminance defects, from the detector 39 (S3).

Subsequently, the shape of the dimmer 10 to be formed by irradiation of a high-energy beam is calculated in the arithmetic unit 41 based on the acquired shape information (S4).

After that, the drive unit 40 positions the optical system of the luminance defect corrector 100 based on the acquired position information. Moreover, the luminance defect corrector 100 adjusts a focus F of the high-energy beam to a desired position in the glass substrate GB2. The position of the focus F is adjusted based on, for example, the size of the foreign matter 33, the cause of a luminance defect, or a measured luminance value. For example, as shown in FIG. 15, the focus F of the high-energy beam is adjusted to the vicinity of the foreign matter 33 in the glass substrate GB2. Subsequently, the luminance defect corrector 100 emits the high-energy beam from the high-energy beam oscillator 101. The high-energy beam emitted from the high-energy beam oscillator 101 passes through the slit 102, which spatially transmits the high-energy beam to the formation region of the dimming region, and then the high-energy beam converges through the condenser lens 103 to the focus F in the glass substrate GB2. This forms the dimming region (S5). Subsequently, the drive unit 40 moves the irradiation position of the high-energy beam; meanwhile, the high-energy beam is continuously emitted. This forms the multiple dimming regions, leading to the formation of the dimmer.

Thus, the dimmer is formed according to the shape and size of a luminance defect, thereby correcting only a necessary and sufficient region. As will be described later, after the correction, a test and a correction are repeated so as to reliably eliminate an insufficient correction. Hence, a deterioration of display quality can be further suppressed.

If the dimmer includes the multiple dimming layers, the first dimming layer 11 near the foreign matter 33, the cause of a luminance defect, is preferably formed by a pulse laser having lower power than the second dimming layer 12 that is farther from the foreign matter 33 than the first dimming layer 11. When the power of the pulse laser is reduced, the peak intensity can be reduced or a wavelength can be increased. Thus, the influence to the liquid crystal layer LC can be reduced.

Figure 14:
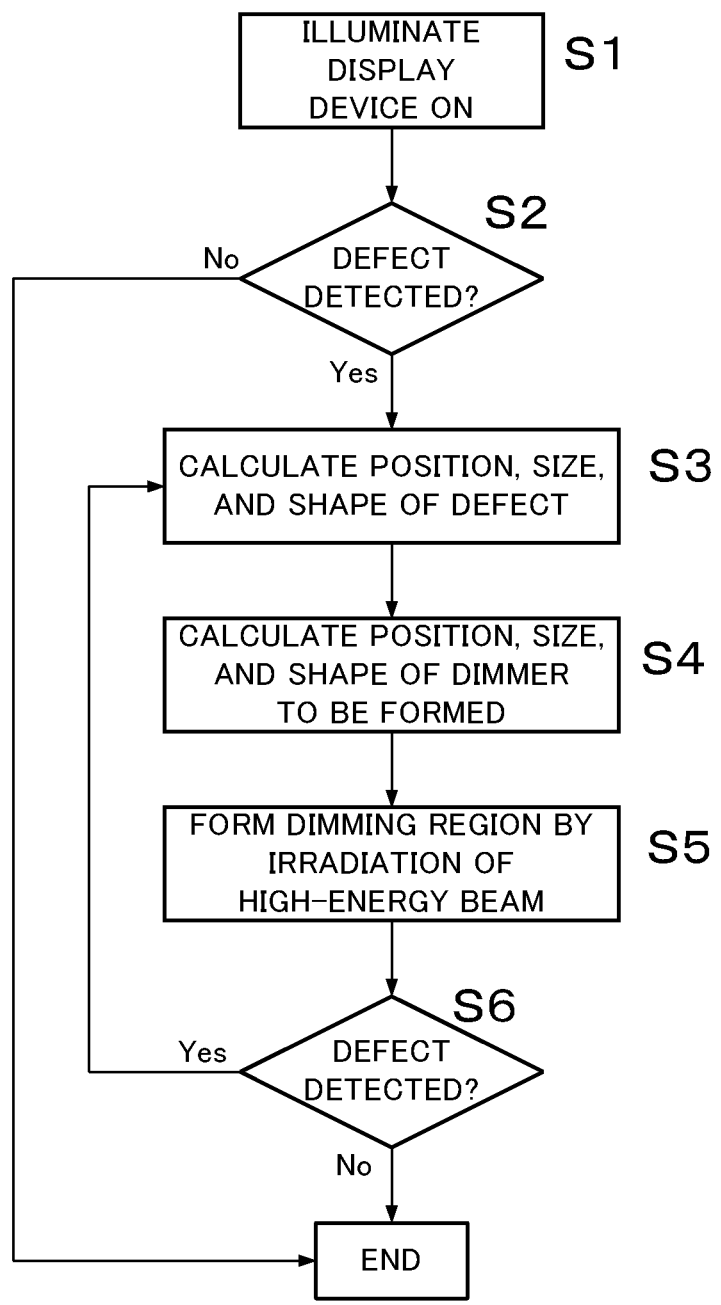
FIG. 14 is another flowchart showing a method of correcting a luminance defect in the liquid crystal display of the present invention.

FIG. 14 is a flowchart showing another method of correcting a luminance defect.

First, the display device is illuminated (S1) to detect a luminance defect (S2), and then the luminance defect corrector 100 acquires position information and shape information about pixels having luminance defects, from the detector 39 (S3). Subsequently, the shape of the dimmer 10 to be formed by irradiation of a high-energy beam is calculated in the arithmetic unit 41 based on the acquired shape information (S4).

After that, the drive unit 40 positions the optical system of the luminance defect corrector 100 based on the acquired position information. Moreover, the luminance defect corrector 100 adjusts the focus F of the high-energy beam to a desired position in the glass substrate GB2. The position of the focus F is adjusted based on, for example, the size of the foreign matter 33, the cause of a luminance defect, or a measured luminance value. For example, as shown in FIG. 15, the focus F of the high-energy beam is adjusted to the vicinity of the foreign matter 33 in the glass substrate GB2. Subsequently, the luminance defect corrector 100 emits the high-energy beam from the high-energy beam oscillator 101. The high-energy beam emitted from the high-energy beam oscillator 101 passes through the slit 102 and then converges through the condenser lens 103 to the focus F in the glass substrate GB2. This forms the dimming region (S5).

Subsequently, the drive unit 40 moves the irradiation position of the high-energy beam; meanwhile, the high-energy beam is continuously emitted. This forms the multiple dimming regions, leading to the formation of the dimmer 10.

After the formation of the dimmer 10, a lighting test is conducted again to confirm the absence of a luminance defect (S6). Also from the second lighting test, a detected luminance defect is corrected again. Steps 1 to 5 are repeated until no luminance defect is detected. From the second test, the dimmer 10 formed in the correction of a luminance defect may have a different shape or size from the dimmer 10 formed in the first test.

Figure 16:
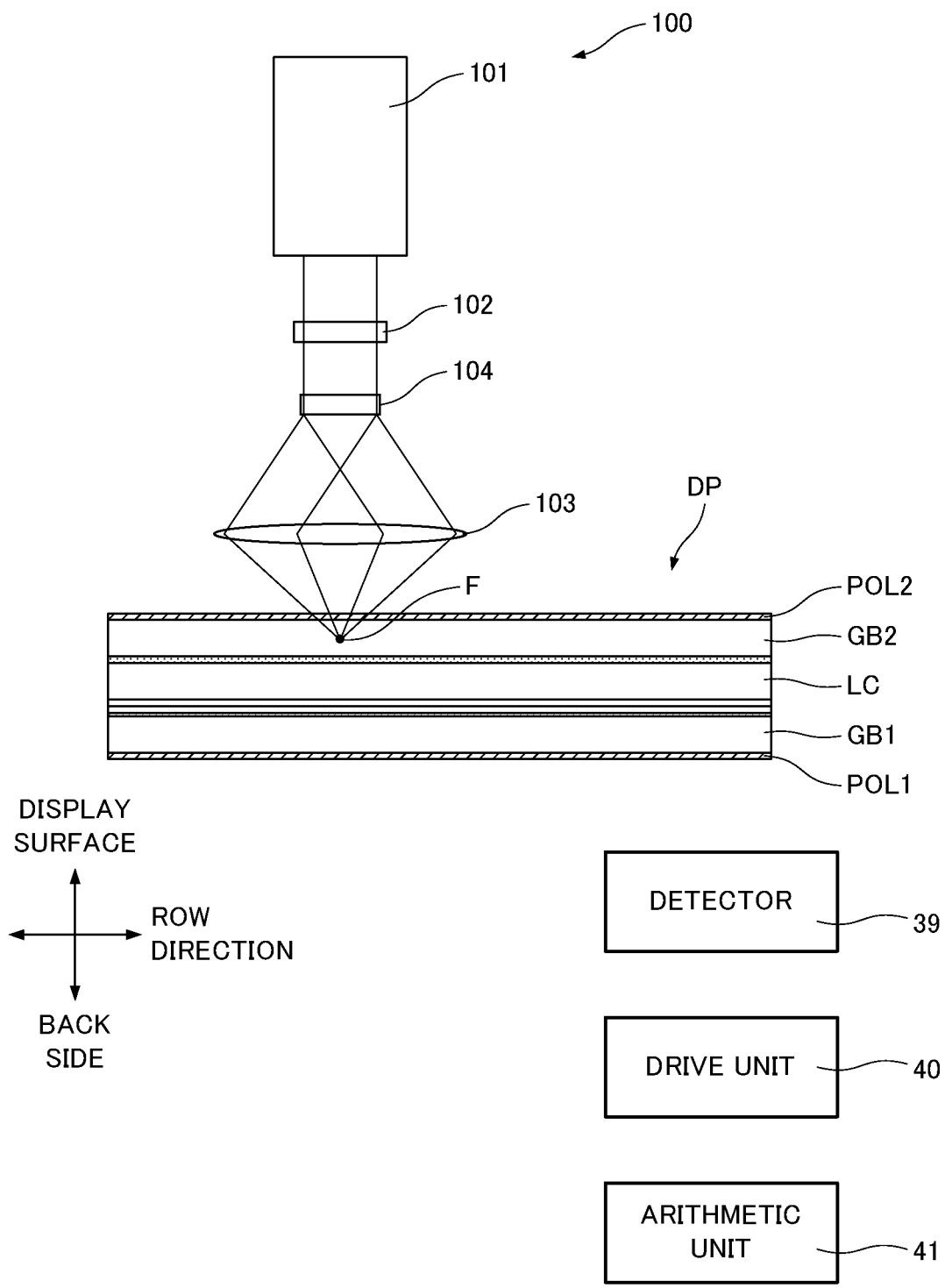
FIG. 16 is a schematic diagram showing another configuration of the production equipment for the liquid crystal display of the present invention.

FIG. 16 shows another schematic configuration of the luminance defect corrector 100. The luminance defect corrector 100 includes a high-energy beam oscillator 101, a slit 102, a beam separator 104, and a condenser lens 103.

As shown in FIG. 16, the luminance defect corrector 100 emits a high-energy beam from the high-energy beam oscillator 101. Thus, the high-energy beam emitted from the high-energy beam oscillator 101 passes through the slit 102 and then is split or divided into multiple beams by the beam separator 104. The split high-energy beams are caused to converge through the condenser lens 103 to the focus F in the glass substrate GB2 such that the beams are superimposed on one another. Subsequently, the high-energy beam is continuously emitted while the irradiation position of the high-energy beam is moved. This forms the dimmer 10.

Thus, a high-energy beam transmitted without contributing to the formation of the dimmer 10 is considerably dispersed. The dispersion of the beam lowers the energy density of a high-energy beam reaching a liquid crystal, thereby reducing damage to the liquid crystal layer LC. In FIG. 16, the single condenser lens 103 is used. Multiple condenser lenses may be used instead as long as the focuses of high-energy beams can be superimposed on one another at a predetermined position of the formation of the dimmer 10. The multiple condenser lenses are preferably used because the collection of high-energy beams is improved and the high-energy beams transmitted through the dimmer 10 are considerably dispersed so as to reduce damage to the liquid crystal layer LC. The beam separator 104 may be a beam splitter, a diffractive optical element, and so on.

As has been discussed, the dimmer 10 may be formed in the glass substrate GB2 or each of the glass substrate GB1 and the glass substrate GB2. If the dimmer 10 is formed in the glass substrate GB1, a high-energy beam may be emitted to the glass substrate GB1 from the back side of the display panel DP.

The high-energy beam oscillator 101 preferably generates a pulse laser beam of 1 picosecond or less. The high-energy beam oscillator 101 is preferably capable of oscillating high-energy beams of multiple wavelengths and selecting the wavelength of the high-energy beam emitted to form the dimming region.

In the step of correcting a luminance defect, a glass material is colored by irradiation of a high-energy beam focusing on a glass substrate. This does not change the shape of the glass substrate. For example, the inside or surface of the glass substrate is not broken so as to change the outside shape. Thus, the step of correcting a luminance defect can be performed, for example, in a state in which the polarizing plates POL1 and POL2 are formed in the TFT substrate SUB1 and the CF substrate SUB2, that is, after the completion of the display panel DP. Since the dimmer 10 is made of the same material as the glass substrate, the index of refraction of the dimmer 10 is not changed. Instead of coloring on the glass material, a phase change of the glass material may change the transmittance of light.

In the step of correcting a luminance defect, the intensity of a high-energy beam to be emitted may be adjusted according to the color of a pixel corresponding to a part having a luminance defect. Thus, the dimmer 10 is formed such that the transmittance of light varies with the color of a pixel corresponding to a part having a luminance defect. For example, the dimmer 10 covering a region supposed to have a luminance defect corresponding to a green pixel may be formed such that it has the transmittance of light lower than the transmittance of light of the dimmer 10 covering a region supposed to have a luminance defect corresponding to a pixel of another color (e.g., a red pixel or a blue pixel).

The step of manufacturing the TFT substrate SUB1 may include the step of doping the glass substrate GB1 with a coloring material. Similarly, the step of manufacturing the CF substrate SUB2 may include the step of doping the glass substrate GB2 with a coloring material. In the doping step, for example, a coloring material may be mixed with a glass material or the surface of the glass substrate may be coated with a coloring material. The coloring material may be particles of gold, silver, copper, aluminum, lead, particles of platinum and so on, or particles of alloys of these metals. The glass substrate doped with the coloring material is irradiated with a high-energy beam so as to color the dimmer 10 according to the coloring material. Thus, a part having a luminance defect can be changed to a desired color. This can reduce the noticeability of leakage of light.

In the foregoing explanation, a luminance defect occurs when the foreign matter 33 is trapped between the TFT substrate SUB1 and the CF substrate SUB2. The cause of a luminance defect is not limited to the foreign matter. For example, light may leak due to a defect of the thin film transistor TFT or spacers disposed between the substrates. The method of correcting a luminance defect according to the present embodiment is also applicable to such luminance defects.

Moreover, the foreign matter 33 supposed to cause a luminance defect is not always trapped between the TFT substrate SUB1 and the CF substrate SUB2. For example, also in the case of a foreign matter trapped between the glass substrate GB1 and the polarizing plate POL1, a luminance defect may occur. In this case, the dimmer 10 may be formed near the foreign matter 33 in the glass substrate GB1. Furthermore, also in the case of a foreign matter trapped between the glass substrate GB2 and the polarizing plate POL2, a luminance defect may occur. In this case, as shown in FIG. 7, the dimmer 10 may be formed near the foreign matter 33 in the glass substrate GB2.

In this way, the foreign matter 33 may be trapped at any position of the display panel DP. Thus, for example, in the single display panel DP, the foreign matter 33 that causes a luminance defect is trapped between the glass substrate GB1 and the polarizing plate POL1 (first position) and between the glass substrate GB2 and the polarizing plate POL2 (second position). In this case, a first dimmer 10 may be formed near the foreign matter in the glass substrate GB1 so as to correspond to the foreign matter at the first position, whereas a second dimmer 10 may be formed near the foreign matter in the glass substrate GB2 so as to correspond to the foreign matter at the second position. Moreover, in this case, both of the first dimmer 10 and the second dimmer 10 may be formed near the display surface of the glass substrate GB2 in consideration of working efficiency in the step of correcting a luminance defect.

The dimmer is not always formed in the glass substrate and may be formed on a surface of the glass substrate. For example, the dimmer may be formed on each of the display surface of the glass substrate GB1 and the backside surface of the glass substrate GB2. The dimmer may be formed on each of the backside surface of the glass substrate GB1 and the display surface of the glass substrate GB2.

The embodiments of the present invention were described in the foregoing explanation. The present invention is not limited to the embodiments. Needless to say, the technical scope of the present invention also includes a configuration properly changed by a person skilled in the art from the embodiments within the scope of the present invention.

The present invention is useful particularly for a liquid crystal display including a display device or an organic electroluminescent flat panel display and is optimally used for a display device of a display that requires a high luminance, a high resolution, and uniform image quality. The present invention can be widely used for electric equipment and apparatuses having displays.

LIST OF REFERENCE SIGNS

LCD liquid crystal display
DP display panel
SUB1 TFF substrate
SUB2 CF substrate
LC liquid crystal layer
GB1, GB2 glass substrate
GSN, PAS, UPAS insulating film
GL gate line
DL data line
SM source electrode
DM drain electrode
SEM semiconductor layer
CIT common electrode
PIT display electrode
TFT thin-film transistor
P pixel
AF alignment layer
CF color filter
BM black matrix
OC overcoat layer
POL1, POL2 polarizing plate
CONT contact hole
10 dimmer
11 dimming layer
12 dimming layer
20 dimming region
20A dimming region
20B dimming region
30 data-line driving circuit
31 gate-line driving circuit
32 opening
33 foreign matter
34 backlight
35, 36 center
37 backlight device
38 overlapping portion
39 detector
40 drive unit
41 arithmetic unit
100 luminance defect corrector
101 high-energy beam oscillator
102 slit
103 condenser lens
104 beam separator
F focus

What is claimed is:

1. A method of correcting a luminance defect, comprising:
testing lighting of a display panel in order to detect the luminance defect;
detecting a position and a shape of the luminance defect;
calculating a position and a shape of a formation region of a dimmer from the detected luminance defect; and
forming, in a glass substrate, the dimmer including a plurality of dimming regions having a lower transmittance of light than the glass substrate, the dimmer being formed by irradiating the formation region of the dimmer in the glass substrate with an energy beam,
wherein the dimmer formed in the forming step includes a plurality of dimming layers, the dimming layers including a first dimming layer and a second dimming layer with the dimming regions arranged in a planar fashion, and
the dimming regions making up the second dimming layer are farther from a cause of the luminance defect than the first dimming layer, with the dimming regions making up the first dimming layer formed by a pulse laser having lower power than that for the dimming regions making up the second dimming layer.

2. The method of correcting a luminance defect according to claim 1, wherein the dimming regions making up the first dimming layer are formed by a pulse layer having lower peak intensity than that for the dimming regions making up the second dimming layer.

3. The method of correcting a luminance defect according to claim 1, wherein the dimming regions making up the first dimming layer are formed by a pulse layer having a longer wavelength than that for the dimming regions making up the second dimming layer.

4. A luminance defect corrector comprising:
a detector that detects a luminance defect of a display device by illuminating the display device;
an arithmetic unit that calculates a formation region for forming a dimmer including a plurality of dimming regions, from a position and a shape of the detected luminance defect;
an energy beam oscillator that emits an energy beam to be used for forming the dimming regions;
a slit that spatially transmits the energy beam to a position where the dimming region is formed;
a condenser lens that converges the energy beam;
a drive unit that moves an irradiation region of the energy beam and the display device relative to each other; and
a beam separator that splits or divides the energy beam having passed through the slit, into a plurality of energy beams,
wherein the split or divided energy beams are caused to converge through the condenser lens and focuses of the energy beams are superimposed on one another.

* * * * *